(12) United States Patent
Varney

(10) Patent No.: US 8,887,406 B2
(45) Date of Patent: Nov. 18, 2014

(54) FOOTER SQUARE APPARATUSES

(76) Inventor: Curtis Randy Varney, Greeneville, TN (US)

( * ) Notice: Subject to any disclaimer, the term of this patent is extended or adjusted under 35 U.S.C. 154(b) by 132 days.

(21) Appl. No.: 13/439,017

(22) Filed: Apr. 4, 2012

(65) Prior Publication Data

US 2012/0246952 A1    Oct. 4, 2012

Related U.S. Application Data

(60) Provisional application No. 61/471,382, filed on Apr. 4, 2011.

(51) Int. Cl.
*G01C 15/12*   (2006.01)
*G01B 3/56*    (2006.01)
*E04G 21/18*   (2006.01)
*B25H 7/02*    (2006.01)

(52) U.S. Cl.
CPC ............ *G01B 3/566* (2013.01); *E04G 21/1833* (2013.01); *G01C 15/12* (2013.01); *B25H 7/02* (2013.01)
USPC .............................................. 33/405; 33/535

(58) Field of Classification Search
CPC ...... G01C 15/12; E04G 21/1833; B43L 7/027
USPC ........................ 33/405, 1 LE, 404, 535, 413
See application file for complete search history.

(56) References Cited

U.S. PATENT DOCUMENTS

| | | | | |
|---|---|---|---|---|
| 299,625 A | | 6/1884 | Covell | |
| 661,483 A | * | 11/1900 | Barrie | 33/27.03 |
| 868,421 A | | 10/1907 | Feil | |
| 1,327,198 A | * | 1/1920 | Carlson | 33/1 LE |
| 1,368,857 A | * | 2/1921 | Stevens | 33/1 R |
| 1,401,200 A | * | 12/1921 | Smith | 33/285 |
| 1,897,682 A | * | 2/1933 | Souders | 33/404 |
| 2,586,074 A | * | 2/1952 | Memluck | 33/1 LE |
| 2,758,380 A | * | 8/1956 | Harris | 33/1 N |
| 2,872,733 A | * | 2/1959 | Chew | 33/1 LE |
| 3,061,931 A | * | 11/1962 | Di Stefano | 33/1 R |
| 4,999,922 A | * | 3/1991 | Loggins | 33/474 |
| 5,107,595 A | | 4/1992 | Stay et al. | |
| 5,118,184 A | * | 6/1992 | Kordana | 356/140 |
| 5,119,565 A | * | 6/1992 | Horvath et al. | 33/405 |
| 6,122,834 A | | 9/2000 | Rester | |
| 6,327,786 B1 | | 12/2001 | Felix | |
| 6,978,553 B2 | | 12/2005 | Doublet | |
| 2008/0256810 A1 | * | 10/2008 | Akihary | 33/1 N |

* cited by examiner

*Primary Examiner* — Christopher Fulton

(57) ABSTRACT

A footer square apparatus for squaring a building foundation may include a footer square body, a first guide line, a second guide line, and a post receiving opening. The first guide line may be disposed on the footer square body and have a length that is substantially straight. The second guide line may be disposed on the footer square body and have a length that is substantially straight. The post receiving opening may be disposed through the footer square body and may receive a post. The length of the first guide line may be substantially perpendicular to the length of the second guide line. The post receiving opening may be located at the intersection of the first guide line and the second guide line.

15 Claims, 3 Drawing Sheets

FOOTER SQUARE APPARATUSES

REFERENCE TO RELATED APPLICATIONS

The present application claims priority to U.S. Provisional Application 61/471,382, filed Apr. 4, 2011, titled FOOTER SQUARE, which is incorporated herein by reference.

TECHNICAL FIELD

Embodiments provided herein generally relate to construction, and more specifically to equipment and methods for squaring a foundation of a structure.

BACKGROUND

Squaring the foundation of a structure, wherein a construction surface is marked at the perimeter of the foundation of a structure, is a necessary step in many construction projects. For example, a construction project may require the corners of a rectangular foundation of a structure be visually marked, such as with posts. However, squaring foundations of structures can be a difficult and time consuming process.

Special tools may be required to precisely mark the position where a structure is to be built. However, these tools may not give users any concrete and discernable indication of being completely square or rectangular with 90° angles on all sides, requiring users to determine the proper position simply by their visual perception. This method may cause inaccuracies and thus, flaws in the resulting structure.

Accordingly, a need exists for a device and process to efficiently square a foundation of a structure.

SUMMARY

In one embodiment, a footer square apparatus for squaring a foundation of a structure may comprise a footer square body, a first guide line, a second guide line, and a post receiving opening. The first guide line may be disposed on the footer square body and have a length that is substantially straight. The second guide line may be disposed on the footer square body and have a length that is substantially straight. The post receiving opening may be disposed through the footer square body and may receive a post. The length of the first guide line may be substantially perpendicular to the length of the second guide line. The post receiving opening may be located at the intersection of the first guide line and the second guide line.

In another embodiment, a system for squaring a foundation of a structure may comprise a footer square apparatus, a first string segment, a second string segment, and a post. The footer square apparatus may comprise a footer square body, a first guide line disposed on the footer square body and having a length that may be substantially straight, a second guide line disposed on the footer square body and having a length that may be substantially straight, and a post receiving opening disposed through the footer square body that may receive a post. The length of the first guide line may be substantially perpendicular to the length of the second guide line. The post receiving opening may be located at the intersection of the first guide line and the second guide line. The post may be partially inserted into a construction surface and may be positioned in a substantially vertical direction. The first string segment may be aligned with the first guide line and second string segment may be aligned with the second guide line.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

A footer square apparatus for squaring a foundation of a structure generally comprises a footer square body, a first guide line, a second guide line, and a post receiving opening disposed through the footer square body. Generally, to operate the footer square apparatus the footer square apparatus is mounted onto a post and one or more string segments are aligned with the first guide line and second guide line respectively to measure a right angle for a foundation of a structure.

Figure 1:
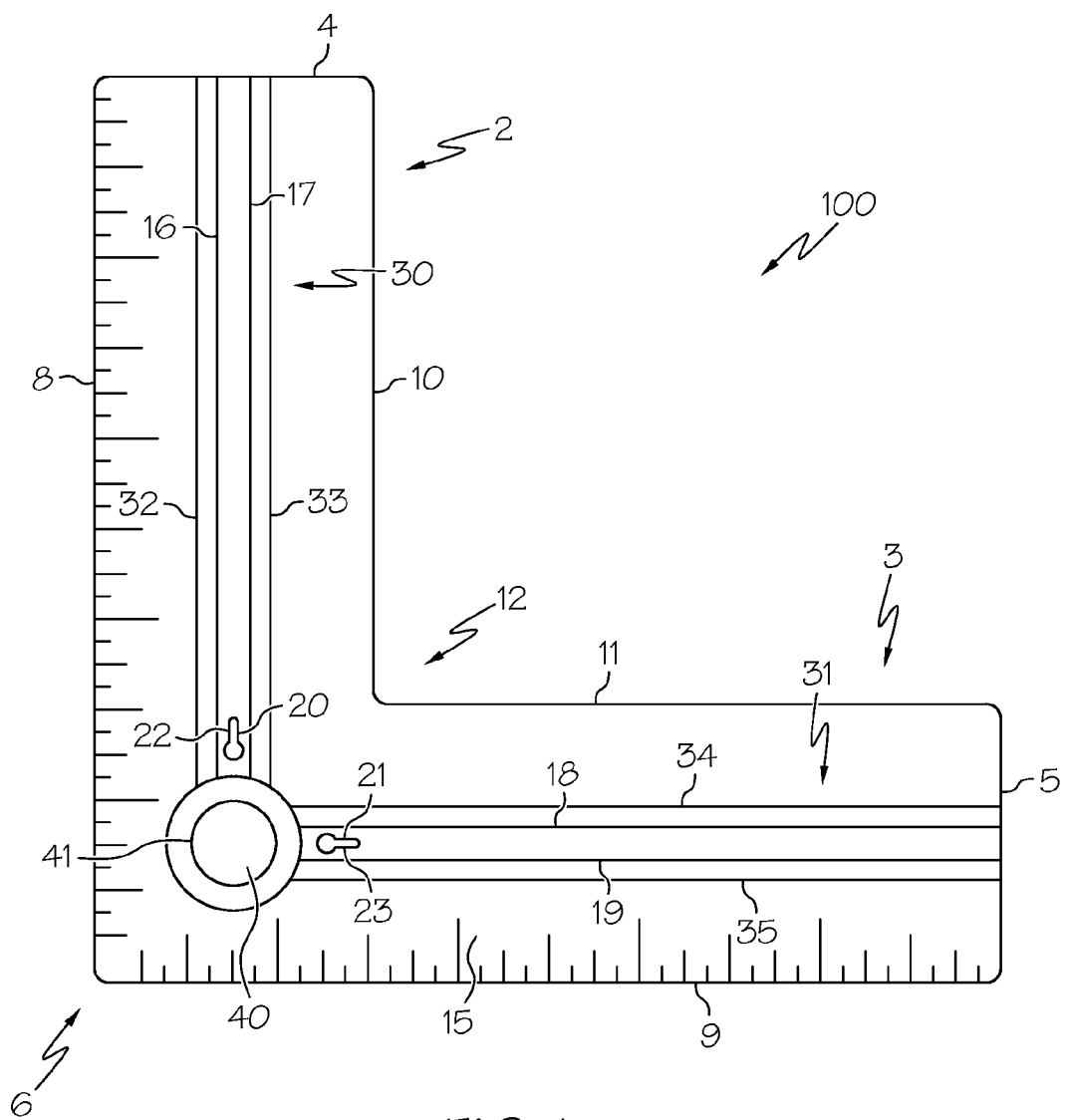
FIG. 1 schematically depicts a top view of a footer square apparatus according to one or more embodiments shown and described herein.
Figure 2:
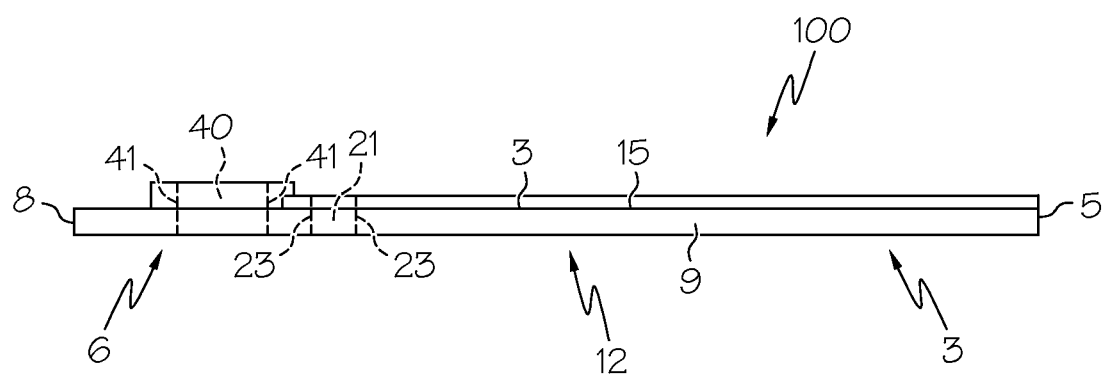
FIG. 2 schematically depicts a side view of a footer square apparatus according to one or more embodiments shown and described herein.
Figure 3:
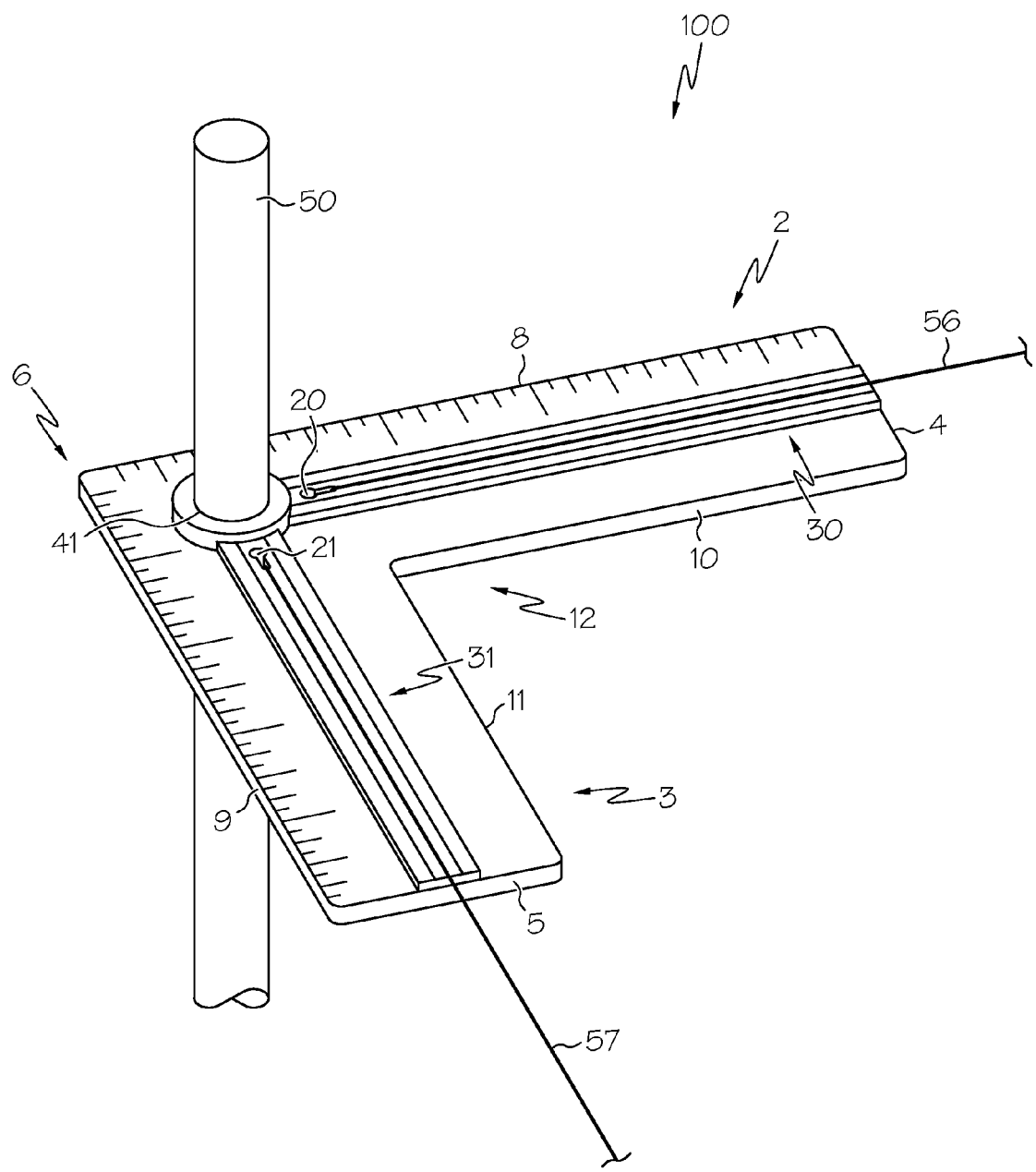
FIG. 3 schematically depicts a footer square apparatus mounted on a post according to one or more embodiments shown and described herein.

Referring now to FIGS. 1-3, an embodiment of a footer square apparatus 100 is schematically depicted. The footer square apparatus 100 comprises a footer square body 12 that may be a rigid material that provides the structure of the footer square apparatus 100. The footer square body 12 may comprise rigid materials such as, but not limited to, molded plastic, wood, metallic material, or combinations thereof. In one embodiment, the footer square body 12 may be "L-shaped" with a first leg 2 and a second leg 3 emanating from a central region 6. The first leg 2 and the second leg 3 may both protrude from a central region 6 of the footer square body 12 at about a right angle relative to each other. The first leg 2 may be defined by a first leg end 4, a first leg outer edge 8, and a first leg inner edge 10. The first leg outer edge 8 may define the length of the first leg 2 as measured by the distance between the first leg end 4 and the second leg outer edge 9. Similarly, the second leg 3 may be defined by a second leg end 5, a second leg outer edge 9, and a second leg inner edge 11. The second leg outer edge 9 may define the length of the second leg 3 as measured by the distance between the second leg end 5 and the first leg outer edge 8.

In one embodiment, the first leg 2 and second leg 3 may have lengths of between about 2 inches and about 2 feet. In another embodiment, the first leg 2 and second leg 3 may have lengths of between about 3 inches and about 12 inches. In one embodiment, the first leg 2 and the second leg 3 have lengths of about 5 inches. It should be understood that the first leg 2 and second leg 3 need not have equal lengths. The footer square body 12 has a height defined by the first leg end 4, second leg end 5, first leg outer edge 8, first leg inner edge 10, second leg outer edge 9, and second leg inner edge 11, as shown in the vertical direction in FIG. 2. The height of the footer square body 12 may be substantially less than the length of the first leg 2 and the second leg 3.

Referring still to FIGS. 1-3, the footer square apparatus 100 has at least a first guide line 30 and second guide line 31. The first guide line 30 and second guide line 31 may each be disposed on a top surface 15 of the footer square body 12. The first guide line 30 and second guide line 31 may be printed onto the footer square body 12 in a color different from the color of the footer square body 12 or may be indicated by a raised, textured, or otherwise contoured surface of the footer square body 12. For example, the first guide line 30 and second guide line 31 may be a raised area of the footer square body 12 on the top surface 15. In one embodiment, the first guide line 30 is disposed along the length of the first leg 2, and the second guide line 31 is disposed along the length of the second leg 3.

The first guide line 30 and second guide line 31 may be substantially straight respectively. However, the first guide line 30 and second guide line 31 need not be entirely straight lines. The first guide line 30 and second guide line 31 may be any pattern or design which allows a user to align a string that is held straight with the first guide line 30 or second guide line 31. For example, the first guide line 30 or second guide line 31 could be a pattern of shapes that are aligned in a straight line. The guide line may even be a single marking, for example a marking on the first or second leg 3, which allows for a string to be properly aligned. It should be understood that a guide line as used herein need not have the physical features of a geometric line, but may be any collection of points or a pattern that allow a string to be aligned at a desired angle, such as two points.

In some embodiments, the first guide line 30 or second guide line 31 may comprise a collection of markings. In one embodiment, the first guide line 30 comprises two inner guide line markings 16,17 and two outer guide line markings 32,33, such that the inner guide line markings 16,17 are parallel lines that are parallel to the outer guide line markings 32,33. Similarly, the second guide line 31 may comprise two inner guide line markings 18,19 and two outer guide line markings 34,35, such that the inner guide line markings 18,19 are parallel lines that are parallel to the outer guide line markings 34,35. For example, the first guide line 30 may comprise a set of parallel lines 16,17,32,33. Similarly, the second guide line 31 may comprise a set of parallel lines 18,19,34,35. In one embodiment, the outer guide line markings 32,33,34,35 are raised areas on the top surface 15 of the footer square body 12. The inner guide line markings 16,17,18,19 may be contoured lines that are disposed on the raised area defined by the outer guide line markings 32,33,34,35. However, it should be understood that in some embodiments, a collection of lines need not be disposed on the footer square body 12, as a small marking or straight line may function as a first guide line 30 or second guide line 31. Additionally, in some embodiments, more than one set of outer line markers may be disposed on the footer square body 12 to form the first guide line 30 or second guide line 31.

The first guide line 30 may be perpendicular to the second guide line 31, such that a right angle is formed by the first guide line 30 and second guide line 31. In other embodiments, the first guide line 30 and second guide line 31 may be at other angles with respect to one another if a non-right angle is desired in the foundation of the structure.

The footer square body 12 may comprise a post receiving opening 40 that is disposed through the footer square body 12 and defined by a post receiving opening wall 41. The post receiving opening 40 can receive a post 50, such that the post 50 can be inserted through the post receiving opening 40, as shown in FIG. 3. Alternatively, in some embodiments, the post receiving opening 40 may allow the footer square apparatus 100 to be mounted on a post 50 without the post 50 passing completely through the post receiving opening 40. The post receiving opening 40 may have a circular cross section, such as a circular shape that is sized to complement a substantially cylindrical shaped post 50. However, it should be understood that the shape and size of the cross section of the post receiving opening 40 may be any size and shape such as to complement the size and shape of a given post 50.

In one embodiment, the post receiving opening 40 is positioned at the intersection of the first guide line 30 and second guide line 31. The first guide line 30 and second guide line 31 may emanate from the post receiving opening 40 and project at a right angle.

The footer square body 12 of the footer square apparatus 100 may comprise one or more string receiving openings 20,21 that pass through the footer square body 12 and are defined by string receiving opening walls 22,23. A first string receiving opening 20 may be disposed on the first guide line 30 and allow a string or other wire to pass through the footer square body 12. The first string receiving opening 20 may be positioned on the first guide line 30 at the proximal end of the first guide line. Similarly, the second string receiving opening 21 may be positioned on the second guide line 31 at the proximal end of the second guide line. The first string receiving opening 20 and the second string receiving opening 21 may be of any shape such that a string can be secured at the string receiving opening 22,23 and maintain a stationary position at the first string receiving opening 20 and second string receiving opening 21. For example, a string segment 56,57 could pass through a string receiving opening 20,21, be knotted on the underside of the footer square body 12 and be pulled taught on the top side of the footer square body 12 to the distal end of the applicable guide line.

Now referring to FIG. 3, the footer square apparatus 100 may be used to square a building foundation. Generally, to operate the footer square apparatus 100, the footer square body 12 may be mounted to a post 50 and a first string segment 56 is aligned with the first guide line 30 and a second string segments 57 is aligned with the second guide line 31.

The post 50 may be inserted into the construction surface, such that the length of the post 50 is substantially vertical. The post 50 is inserted into the construction surface at a corner of a rectangular foundation of a building or other structure. In one embodiment, the footer square body 12 is positioned on the post 50 at a distance above the construction surface, wherein the post 50 is disposed through the post receiving opening 40. For example, the footer square apparatus 100 can be positioned at about 6 inches, about 12 inches, about 24 inches, or even about 5 feet above the construction surface.

A first string segment 56 may be may be positioned through the first string receiving opening 20 and a second string segment 57 may be positioned through the second string receiving opening 21. The first string segment 56 is aligned with the first guide line 30 and the second string segment 57 is aligned with the second guide line 31, such that the first string segment 56 is substantially parallel to the first guide line 30 and the second string segment 57 is substantially parallel to the second guide line 31. The first string segment 56 and the second string segment 57 may be arranged such that the first string segment 56 and second string segment 57 are at a 90° angle, and such that the first string segment 56 and second string segment 57 lie on a horizontal plane. It should be understood that the string may be any suitable type of string such as a woven fabric string, rope, wire, twine, plastic string, or combinations thereof.

Still referring to FIG. 3, in another embodiment, the first string segment 56 and second string segment 57 are two separate strings. The first string segment 56 may be passed through the first string receiving opening 20 and knotted on the footer square underside, such that the first string segment 56 is held stationary at the first string receiving opening 20 when aligned with the first guide line 30 and pulled taught. Similarly, the second string segment 57 may be passed through the second string receiving opening 21 and knotted on the footer square underside, such that the second string segment 57 is held stationary at the second string receiving opening 21 when aligned with the second guide line 31 and pulled taught. In another embodiment, the first string segment 56 and second string segment 57 are a single string. For example, the string may be positioned such that the string is above the footer square body 12 at the first sting segment, is passed through the first string receiving opening 20 to the underside of the footer square body 12, is passed through the second string receiving opening 21 to the topside of the footer square body 12 at the second string segment 57.

In another embodiment, the first string segment 56 and second string segment 57 may be attached to the post 50. For example, the first sting segment and the second string segment 57 may be tied to the post 50, and pulled taught in alignment with the first guide line 30 and second guide line 31 respectively.

To measure a rectangular foundation, the post 50 is inserted at a corner of the structure foundation. The first string segment 56 is pulled taught and aligned with the first guide line 30 and the second string segment 57 is pulled taught and aligned with the second guide line 31. The first string segment 56 and second string segment 57 are used as a guide for measuring a right angle and to affix a second and third marker, such as additional posts, into the construction surface at the other corners of the structure. The footer square apparatus 100 may be used on a different corner post, and the process can be repeated until a rectangular building foundation is measured. Additional measuring tools, such as a ruler or other length measuring devices, may be used to measure the distance of the corners marked by posts or other markers.

It should be understood that the footer square apparatus 100 can be positioned above the construction surface when affixed to the post 50, allowing the string to be pulled taught on a horizontal plane and not contact the construction surface. This feature allows for effective measurement of rectangle for a building foundation on uneven construction surfaces, such as hill or other downgrade.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A footer square apparatus for squaring a building foundation comprising:
    a footer square body;
    a first guide line having a proximal end and a distal end, said first guide line disposed on the footer square body and having a length that is substantially straight;
    a second guide line having a proximal end and a distal end, said second guide line disposed on the footer square body and having a length that is substantially straight; and
    a post receiving opening disposed through the footer square body that can receive a post;
    a first string receiving opening disposed through the footer square body, said first string receiving opening positioned at the proximal end of said first guide line, and on said first guide line;
    a second string receiving opening disposed through the footer square body, said second string receiving opening positioned at the proximal end of said second guide line, and on said second guide line; and
wherein:
    the length of the first guide line is substantially perpendicular to the length of the second guide line; and
    the post receiving opening is located at the intersection of the first guide line and the second guide line.

2. The footer square apparatus of claim 1, wherein the footer square body is substantially L shaped and comprises a first leg and a second leg, and wherein the first guide line is disposed on the first leg and the second guide line is disposed on the second leg.

3. The footer square apparatus of claim 1, wherein the first guide line and the second guide line are represented on the footer square body by a contoured surface of the footer square body.

4. The footer square apparatus of claim 1, wherein the first guide line and the second guide line emanate from the post receiving opening.

5. The footer square apparatus of claim 1, wherein the footer square body comprises a rigid material.

6. The footer square apparatus of claim 1, wherein the first guide line and the second guide line each have a length of between about 2 inches and about 18 inches.

7. A system for squaring a foundation of a structure comprising a footer square apparatus, a first string segment, a second string segment, and a post, wherein:
    the footer square apparatus comprises a footer square body, a first guide line having a proximal end and a distal end, said first guide line disposed on the footer square body and having a length that is substantially straight, a second guide line having a proximal end and a distal end, said second guide line disposed on the footer square body and having a length that is substantially straight, a post receiving opening disposed through the footer square body that can receive the post, a first string receiving opening disposed through the footer square body said first string receiving opening positioned at the proximal end of said first guide line, and on said first guide line, and a second string receiving opening disposed through the footer square body, said second string receiving opening positioned at the proximal end of said second guide line, and on said second guide line;

the length of the first guide line is substantially perpendicular to the length of the second guide line;

the post receiving opening is located at the intersection of the first guide line and the second guide line;

the post is inserted into a construction surface and is positioned in a substantially vertical direction;

the first string segment is affixed to said footer square body, at said first string receiving opening, and aligned with the first guide line; and the second string segment is affixed to said footer square body, at said second string receiving opening, and aligned with the second guide line.

8. The footer square apparatus of claim 7, wherein the footer square body is substantially L shaped and comprises a first leg and a second leg, and wherein the first guide line is disposed on the first leg and the second guide line is disposed on the second leg.

9. The footer square apparatus of claim 7, wherein the first guide line and the second guide line are represented on the footer square body by a contoured surface of the footer square body.

10. The footer square apparatus of claim 7, wherein the first guide line and the second guide line emanate from the post receiving opening.

11. The footer square apparatus of claim 7, wherein the footer square body comprises a rigid material.

12. A footer square apparatus for squaring a building foundation comprising:

a footer square body;

a first guide line having a proximal end and a distal end, said first guide line disposed on the footer square body and having a length that is substantially straight;

a second guide line having a proximal end and a distal end, said second guide line disposed on the footer square body and having a length that is substantially straight;

a post receiving opening disposed through the footer square body that can receive a post;

a first string receiving opening disposed through the footer square body, said first string receiving opening positioned at the proximal end of said first guide line, and on the first guide line; and a second string receiving opening disposed through the footer square body, said second string receiving opening positioned at the proximal end of said second guide line, and on the second guide line; and wherein:

the length of the first guide line is substantially perpendicular to the length of the second guide line; and the post receiving opening is located at the intersection of the first guide line and the second guide line.

13. The footer square apparatus of claim 12, wherein the footer square body is substantially L-shaped and comprises a first leg and a second leg, and wherein the first guide line is disposed on the first leg and the second guide line is disposed on the second leg.

14. The footer square apparatus of claim 12, wherein the first guide line and the second guide line are represented on the footer square body by a contoured surface of the footer square body.

15. The footer square apparatus of claim 12, wherein the first guide line and the second guide line emanate from the post receiving opening.

\* \* \* \* \*